US011775498B1

(12) United States Patent
Grzech et al.

(10) Patent No.: US 11,775,498 B1
(45) Date of Patent: *Oct. 3, 2023

(54) ACCELERATED SYSTEM AND METHOD FOR PROVIDING DATA CORRECTION

(71) Applicant: FEDERAL HOME LOAN MORTGAGE CORPORATION (FREDDIE MAC), McLean, VA (US)

(72) Inventors: Matthew Grzech, Leesburg, VA (US); Suresh Kalkavery, Fairfax, VA (US)

(73) Assignee: FEDERAL HOME LOAN MORTGAGE CORPORATION (Freddie Mac), McLean, VA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/367,693

(22) Filed: Jul. 6, 2021

Related U.S. Application Data

(63) Continuation of application No. 16/127,194, filed on Sep. 10, 2018, now Pat. No. 11,068,462, which is a
(Continued)

(51) Int. Cl.
*G06F 16/23* (2019.01)
*G06F 16/18* (2019.01)
(Continued)

(52) U.S. Cl.
CPC ...... *G06F 16/2308* (2019.01); *G06F 11/1469* (2013.01); *G06F 11/1471* (2013.01);
(Continued)

(58) Field of Classification Search
CPC ............ G06F 16/2308; G06F 16/1865; G06F 16/1873; G06F 11/1469; G06F 11/1471;
(Continued)

(56) References Cited

U.S. PATENT DOCUMENTS 5,873,097 A * 2/1999 Harris ................. G06F 16/2308
707/999.203
5,878,434 A * 3/1999 Draper ................ G06F 16/2308
(Continued)

OTHER PUBLICATIONS

Ningning Zhu and Tzi-Cker Chiueh, "Design, implementation, and evaluation of repairable file service," 2003 International Conference on Dependable Systems and Networks, 2003. Proceedings., 2003, pp. 217-226, doi: 10.1109/DSN.2003.1209932. (Year: 2003).*
(Continued)

*Primary Examiner* — Dennis Truong
(74) *Attorney, Agent, or Firm* — FINNEGAN, HENDERSON, FARABOW, GARRETT & DUNNER LLP

(57) ABSTRACT

Systems, methods, and computer-readable storage media are described for processing data change requests. In one exemplary embodiment, a computer-implemented method receives one or more requests in a software production environment for one or more data changes to data from a requestor. The method executes the request(s) in a rollback mode. The method generates a snapshot of the executed request(s). The method also transmits the snapshot to an approver. In response to an approval of the snapshot from the approver, the method also executes the request(s) in a commit mode.

20 Claims, 7 Drawing Sheets

Related U.S. Application Data continuation of application No. 12/954,164, filed on Nov. 24, 2010, now Pat. No. 10,073,844.

(51) Int. Cl.
*G06F 11/14* (2006.01)
*G06Q 20/40* (2012.01)

(52) U.S. Cl.
CPC ...... *G06F 16/1865* (2019.01); *G06F 16/1873* (2019.01); *G06Q 20/401* (2013.01); *G06F 2201/84* (2013.01)

(58) Field of Classification Search
CPC .............. G06F 2201/84; G06F 21/31; Y10S 707/99953; G06Q 20/401
See application file for complete search history.

(56) References Cited

U.S. PATENT DOCUMENTS

| | | | | |
|---|---|---|---|---|
| 6,199,178 | B1 * | 3/2001 | Schneider | G06F 11/1469 714/21 |
| 6,606,626 | B1 * | 8/2003 | Ponnekanti | G06F 16/2308 709/203 |
| 6,957,221 | B1 * | 10/2005 | Hart | G06F 11/2097 |
| 7,761,410 | B2 * | 7/2010 | Hunt | G16H 40/20 707/610 |
| 2002/0095408 | A1 * | 7/2002 | Cheng | G06F 16/284 |
| 2003/0135478 | A1 * | 7/2003 | Marshall | G06F 16/2282 |
| 2004/0054630 | A1 * | 3/2004 | Ginter | H04N 21/6581 375/E7.009 |
| 2005/0033777 | A1 * | 2/2005 | Moraes | G06F 16/27 |
| 2005/0108295 | A1 * | 5/2005 | Karimisetty | G06F 16/8373 |
| 2005/0165668 | A1 * | 7/2005 | Hinkle | G06Q 40/04 705/37 |
| 2006/0155784 | A1 * | 7/2006 | Kusters | G06F 11/1415 |
| 2006/0218159 | A1 * | 9/2006 | Murphy | G06F 16/283 |
| 2007/0083530 | A1 * | 4/2007 | Lakshminath | G06F 9/466 |
| 2007/0088765 | A1 * | 4/2007 | Hunt | G16H 10/60 |
| 2008/0005111 | A1 * | 1/2008 | Savage | G06F 11/1474 |
| 2008/0072290 | A1 * | 3/2008 | Metzer | G06F 16/2308 726/2 |
| 2008/0103818 | A1 * | 5/2008 | Nolan | G16H 10/60 705/2 |
| 2008/0140732 | A1 * | 6/2008 | Wilson | G06F 16/1873 |
| 2009/0006404 | A1 | 1/2009 | Magruder et al. | |
| 2012/0005684 | A1 * | 1/2012 | Ziarek | G06F 9/528 718/103 |
| 2012/0227045 | A1 * | 9/2012 | Knauth | G06F 11/3048 718/100 |

OTHER PUBLICATIONS

Bernoussi et al., "Gemini Project," Oct. 2010, available at https://www.utdallas.edu/gemini/proposals/COA_WorkflowRec.pdf.

York University, "Revised Sole or Single Source Certification," Jan. 2009, available at http://www.yorku.ca/procure/documents/news/PS_Bulletin_09_Jan_Sole_Single_Source_Certification.pdf.

Sewanee, "Treasurer," Feb. 2001, available at http://treasurer.sewanee.edu/accounts-payable.

BMC Communities, "SOX compliancy," Dec. 2007, available at https://communities.bmc.com/thread/8056.

D. Johnson, "Efficient transparent optimistic rollback recovery for distributed application programs," Proceedings of 1993 IEEE 12th Symposium on Reliable Distributed Systems, Princeton, NJ, USA, 1993, pp. 86-95, doi: 10.1109/RELDIS.1993.393470. (Year: 1993).

* cited by examiner

FIG. 3A

| Table | Company | |
|---|---|---|
| Operation | Update | |
| Keys | key | key |
| Columns | firstname | lastname | phone | email |
| Data | John | Smith | 703 555 1212 | John.Smith@mycompany.com |

*Note: FIG. 3A table columns:*

| Table | Company | | | |
|---|---|---|---|---|
| Operation | Update | | | |
| Keys | key | key | | |
| Columns | firstname | lastname | phone | email |
| Data | John | Smith | 703 555 1212 | John.Smith@mycompany.com |

FIG. 3B

| Table | Company | | | | | | |
|---|---|---|---|---|---|---|---|
| Operation | insert | | | | | | |
| Keys | | | | | | | |
| Columns | firstname | lastname | email | dob | phone | dtupdate | operatorid |
| Data | John | Smith | John.Smith@mycompany.com | 8/12/1965 | 703 555 1212 | 1/1/2010 | C879534 |
| Data | Jane | Adams | Jane.Adams@mycompany.com | 6/25/1991 | 571 555 1212 | 2/1/2010 | C879535 |
| Data | Mike | Jones | Mike.Jones@mycompany.com | 3/2/1977 | 202 555 1212 | 3/1/2010 | C879536 |
| Data | Beth | White | Beth.White@mycompany.com | 9/1/1985 | 301 555 1212 | 4/1/2010 | C879537 |

FIG. 3C

| Table | Company | |
|---|---|---|
| Operation | delete | |
| Keys | key | key |
| Columns | firstname | lastname |
| Data | John | Smith |
| Data | Jane | Adams |

FIG. 4A

| | A | B | C | D | E | F |
|---|---|---|---|---|---|---|
| 1 | Table | TABLE-A | | | | |
| 2 | Operation | update | | | | |
| 3 | Keys | key | key | | | |
| 4 | Columns | PK1 | PK2 | ATTRIB1 | ATTRIB2 | |
| 5 | Data | XXXX | XXXX | XXXX | XXXX | |
| 6 | | | | | | |
| 7 | | | | | | |
| 8 | | | | | | |
| 9 | | | | | | |
| 10 | | | | | | |
| 11 | | | | | | |

TABLE-A / TABLE-B / TABLE-C

FIG. 4B

| Table | TABLE-A | | | |
|---|---|---|---|---|
| Operation | update | | | |
| Keys | key | key | | |
| Columns | PK1 | PK2 | ATTRIB1 | ATTRIB2 |
| Data | XXXX | XXXX | XXXX | XXXX |

FIG. 4C

| Table | TABLE-B | | |
|---|---|---|---|
| Operation | delete | | |
| Keys | key | key | |
| Columns | PK1 | PK2 | |
| Data | XXXX | XXXX | |
| Data | | | |

FIG. 4D

| Table | TABLE-C | | | | | | |
|---|---|---|---|---|---|---|---|
| Operation | insert | | | | | | |
| Keys | | | | | | | |
| Columns | ATTRIB1 | ATTRIB2 | ATTRIB3 | ATTRIB4 | ATTRIB5 | ATTRIB6 | ATTRIB7 |
| Data | XXXX | XXXX | XXXX | XXXX | XXXX | XXXX | XXXX |
| Data | | | | | | | |

FIG. 5A

| | A | B | C | D | E | F |
|---|---|---|---|---|---|---|
| 1 | Table | CHILD | | | | |
| 2 | Operation | delete | | | | |
| 3 | Keys | key | key | | | |
| 4 | Columns | PK2 | PK3/FK1 | | | |
| 5 | Data | YYYY | XXXX | | | |
| 6 | Data | ZZZZ | XXXX | | | |
| 7 | | | | | | |
| 8 | | | | | | |
| 9 | | | | | | |
| 10 | | | | | | |

CHILD / PARENT

FIG. 5B

| Table | CHILD | |
|---|---|---|
| Operation | delete | |
| Keys | key | key |
| Columns | PK2 | PK3/FK1 |
| Data | YYYY | XXXX |
| Data | ZZZZ | XXXX |

FIG. 5C

| Table | PARENT |
|---|---|
| Operation | delete |
| Keys | key |
| Columns | PK1/FK1 |
| Data | XXXX |

ACCELERATED SYSTEM AND METHOD FOR PROVIDING DATA CORRECTION

CROSS REFERENCES TO RELATED APPLICATIONS

This application is a continuation of U.S. patent application Ser. No. 16/127,194, filed Sep. 10, 2018 (now allowed) which is a continuation of U.S. patent application Ser. No. 12/954,164 (now U.S. Pat. No. 10,073,844), filed Nov. 24, 2010. The content of the above-referenced applications is expressly incorporated herein by reference in its entirety.

TECHNICAL FIELD

The present disclosure generally relates to providing data correction, and more particularly, to processing and storing data change requests in an audit log.

BACKGROUND

Corporations, such as financial institutions, are required by law to produce financial reports and disclosures that comply with government regulations. For example, the Sarbanes-Oxley Act of 2002 ("Act") requires internal controls for assuring the accuracy of financial reports and disclosures and mandates audits and reports based on those controls. Under Section 404 of the Act, management is required to produce an internal control report as part of each annual report, and the report must affirm the responsibility of management for establishing and maintaining adequate internal control structure and procedures for financial reporting.

Many financial institutions have application level audit trails, but these alone do not provide reasonable assurance that data was not changed via another source external to the financial application. One aspect for ensuring data integrity is the ability to generate a complete audit trail of all changes made to the data, regardless of where the change originated.

A key element for compliance with the Act is separation or segregation of duties, which mandates that more than one person must complete a task for producing financial reports. However, separation of duties is both costly and time-consuming. In current systems, separation of duties may be used to implement an appropriate level of checks and balances upon the activities of individuals to prevent fraud and errors in production. Current systems may achieve separation of duties by disseminating the tasks and associated privileges for a specific business process among multiple users.

In practice, financial institutions may use role-based access control in information technology systems where separation of duties is required. Control of data changes in a database may require financial institutions to assign different steps in a data change process to individual personnel. For example, a first user or group of users may identify a needed data change. When a data change is identified, a second user or group of users may receive the requirements for the data change from the appropriate business unit, create a test script for the data change, and execute the test script in a development environment.

After creation and execution of the test script, the script may be transmitted to a third user or group of users for approval in a test environment. The third user or group of users may review the results of the test and approve them. If the review fails, the script may be returned to the second user or group of users in the development stage for correction and subsequent execution and transmission to the third user or group of users. If the third user or group of users approves the script, the script may be transmitted to a fourth user or group of users for approval in a production environment. The fourth user or group of users may also review the results of the test and approve them. If the review fails, the script may be returned to the second user or group of users in the development stage for correction, and the process begins again. If the fourth user or group of users approves the script, the script may be verified at this time.

Accordingly, numerous users or groups of user are involved in processing a single data change in a database. Because of the number of steps involved and the volume of users needed to create, execute, approve, and verify each change, this process may take many hours if not days to complete. On average, this process may take 8-24 hours to execute a single data change.

Accordingly, systems and methods are needed that reduce the amount of time and the number of users associated with creating, processing, verifying and approving data changes, while still complying with regulations, among other things.

SUMMARY

Consistent with the present invention, as embodied and broadly described herein, systems and methods are disclosed for processing data change requests.

In one exemplary embodiment, a method for processing data change requests in a software production environment is disclosed. The method includes receiving one or more requests for one or more changes to data from a requestor. The method includes executing the request(s) in a rollback mode. The method also includes generating a snapshot of the executed request(s) and transmitting the snapshot to an approver. In response to an approval of the snapshot from the approver, the method executes the request(s) in a commit mode.

In another embodiment, a system for processing data change requests in a software production environment is disclosed. The system includes means for receiving one or more requests for one or more changes to data from a requestor. The system includes means for executing the request(s) in a rollback mode. The system also includes means for generating a snapshot of the executed request(s) and means for transmitting the snapshot to an approver. In response to an approval of the snapshot from the approver, the system includes means for executing the request(s) in a commit mode.

In yet another embodiment, a computer-readable medium including program instructions for performing, when executed by a processor, a method for processing data change requests in a software production environment is disclosed. The method includes receiving one or more requests for one or more changes to data from a requestor. The method includes executing the request(s) in a rollback mode. The method also includes generating a snapshot of the executed request(s) and transmitting the snapshot to an approver. In response to an approval of the snapshot from the approver, the method executes the request(s) in a commit mode.

It is to be understood that both the foregoing general description and the following detailed description are exemplary and explanatory only and are not restrictive of the invention, as described. Further features and/or variations may be provided in addition to those set forth herein. For example, embodiments of the present invention may be directed to various combinations and subcombinations of several further features disclosed below in the detailed description.

BRIEF DESCRIPTION OF THE DRAWINGS

The accompanying drawings, which are incorporated in and constitute a part of this specification, illustrate various features, embodiments and aspects consistent with the invention and, together with the description, explain advantages and principles of the invention. In the drawings.

FIGS. 3A-3C illustrate screenshots of data consistent with an embodiment of the present disclosure;

FIGS. 4A-4D illustrate screenshots of data consistent with an embodiment of the present disclosure;

FIGS. 5A-5C illustrate screenshots of data consistent with an embodiment of the present disclosure;

DESCRIPTION OF THE EMBODIMENTS

Reference will now be made in detail to various embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Figure 1:
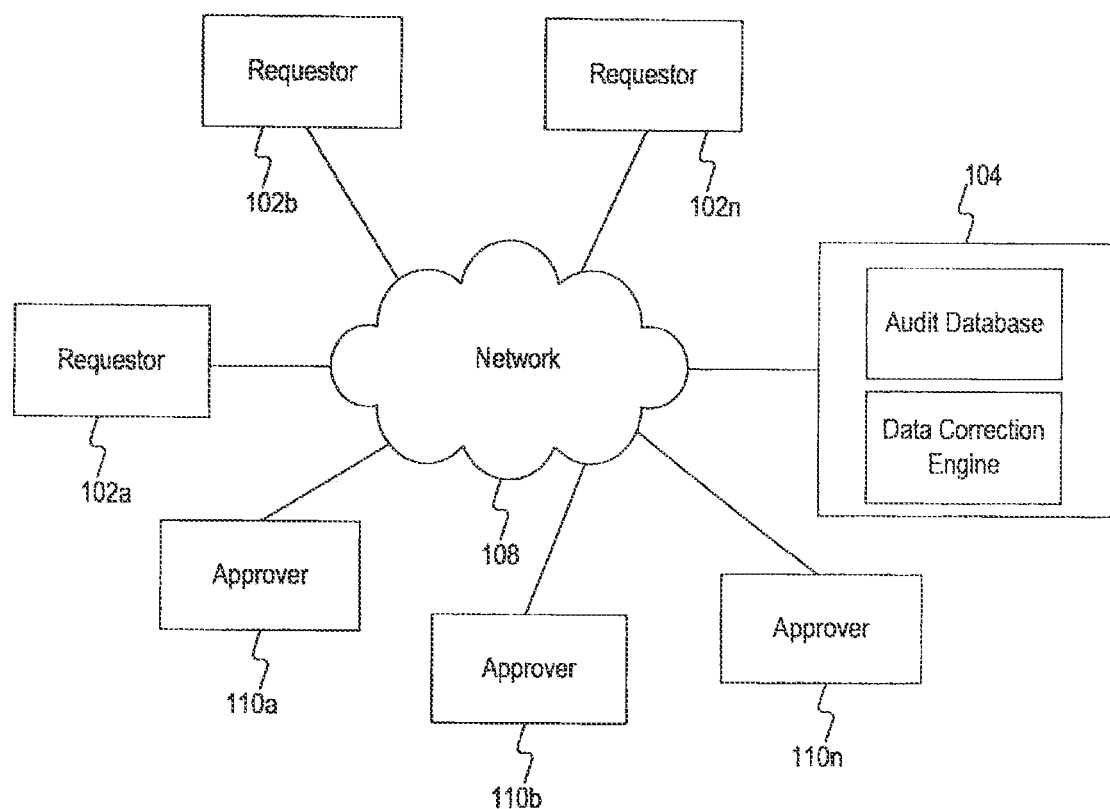
FIG. 1 illustrates an exemplary computing system that can be used to implement embodiments of the disclosure.

FIG. 1 illustrates a system 100 in which the features and principles of the present disclosure may be implemented. The number of components in system 100 is not limited to what is shown, and other variations in the number of arrangements of components are possible, consistent with embodiments of the disclosure. The components of FIG. 1 may be implemented through hardware, software, firmware, etc. System 100 may include one or more requestors 102a through 102n, data correction system 104, network 108, and one or more approvers 110a through 110n.

As illustrated in FIG. 1, requestor(s) 102 may store data and may transmit the data to data correction system 104 via network 108. Data correction system 104 may receive one or more data change requests from requestor(s) 102, process the received data change request(s), and send the processed data change request(s) to approver(s) 110a-110n. Approver(s) 110 may review the data change request(s), and approve or deny each data change request either individually or as a group.

Network 108 provides communications between or among the various entities depicted in system 100. Network 108 may be a shared, public, or private network and may encompass a wide area network (WAN) or local area network (LAN). Network 108 may be implemented through any suitable combination of wired and/or wireless communication networks (including Wi-Fi networks, GSM/GPRS networks, TDMA networks, CDMA networks, Bluetooth networks, or any other wireless networks). By way of example, network 108 may be implemented through a wide area network (WAN), local area network (LAN), an intranet, and/or the internet. Further, the entities of system 100 may be connected to multiple networks 108, such as, for example, to a wireless carrier network, a private data network, and the public Internet.

Requestor(s) 102 may be implemented using one or more processors, such as, for example, computing devices. In an embodiment, requestor(s) 102 may each include one or more databases that store data. The data may include, for example, data regarding one or more borrowers, such as homeowners. The records may include, e.g., a homeowner's name, address, and/or mortgage information such as, for example, a mortgage loan amount, mortgage loan interest rate, a remaining amount of payments or principal on the mortgage loan, and a total amount of the mortgage loan outstanding. One of ordinary skill would appreciate that numerous other records may also be included for each borrower, and that the records may include information regarding loans other than mortgages.

Data correction system 104 may provide a platform for receiving data from requestor(s) 102 and communicating with approver(s) 110. Data correction system 104 may be implemented using a combination of hardware, software, firmware, etc., and may be operable to receive and store data from various requestors 102. For example, in an embodiment, data correction system 104 may receive data from requestor(s) 102 regarding personal records of homeowners.

Data correction system 104 may be implemented using one or more processors, such as, for example, computing devices. Data correction system 104 may also be operable to process requests for changes in data, as explained below.

Requestor(s) 102 may provide users with an interface to network 108. By way of example, requestor(s) 102 may be implemented using any device capable of accessing a data network, such as a general purpose computer or personal computer equipped with a modem or other network interface. Requestor(s) 102 may also be implemented using other devices, such as a Blackberry™, Ergo Audrey™, mobile phones (with data access functions), Personal Digital Assistant ("PDA") with a network connection, IP telephony phone, or generally any device capable of communicating over a data network.

Users may use requestor(s) 102 to transmit one or more data change requests to data correction system 104. In order to transmit such change requests, the user may enter information on, e.g., requestor 102a indicative of changes In data. After the user enters this information, requestor 102a may transmit the data change requests to data correction system 104.

Figure 2:
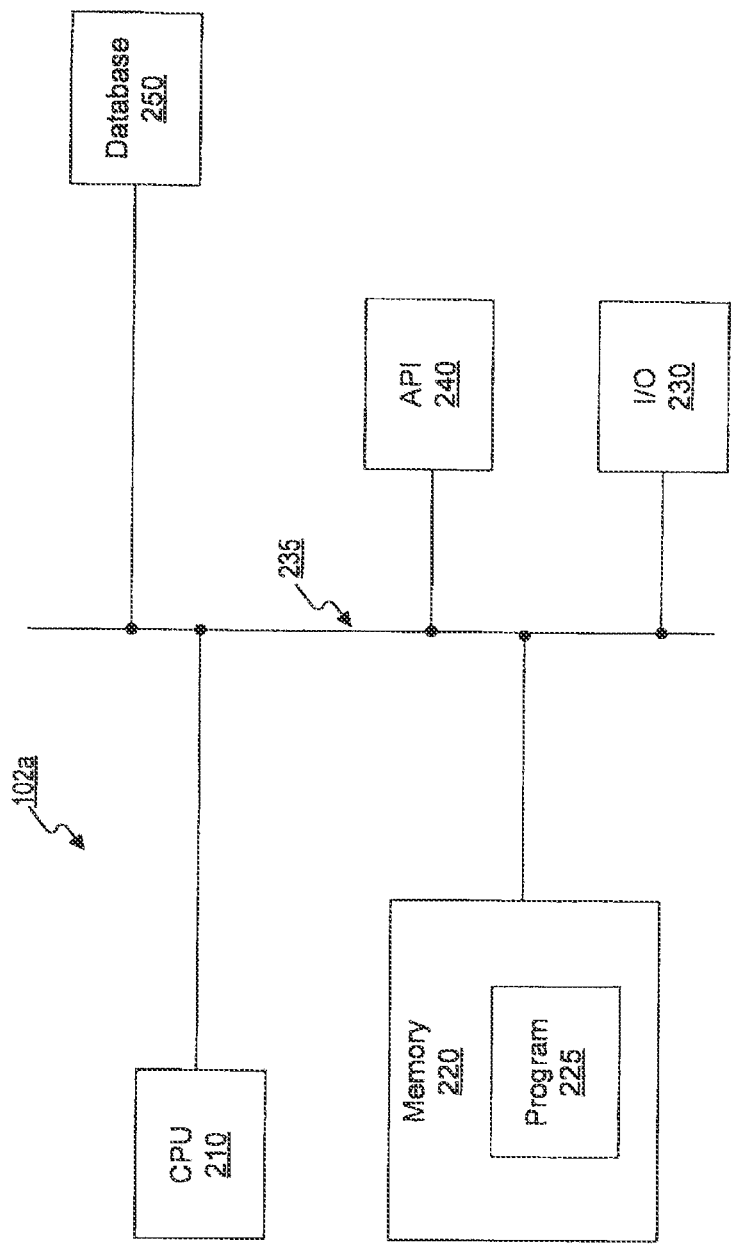
FIG. 2 illustrates an exemplary computing device that can be used to implement embodiments of the disclosure.

FIG. 2 illustrates an exemplary computing device 102a that can be used to implement embodiments of the disclosure. The components and arrangement, however, are not critical to the disclosure. One of ordinary skill will recognize that embodiments of the disclosure may be implemented by computers or workstations organized as shown, organized in a distributed processing system architecture, or organized in myriad suitable combinations of software, hardware, and/or firmware.

As illustrated in FIG. 2, requestor 102a may include components such as a central processing unit (CPU) 210, a memory 220, an input/output (I/O) device(s) 230, an application programming interface (API) 240, and a database 250 that can be implemented in various ways. For example, an integrated platform (such as a workstation, personal computer, laptop, etc.) may comprise CPU 210, memory 220, I/O device(s) 230, API 240, and database 250, interconnected by a local bus 235. In such a configuration, components 210, 220, 230, 240, and 250 may connect through a local bus interface.

CPU 210 may include one or more known processing devices, such as a microprocessor from the Pentium family manufactured by Intel™ or a mainframe-class processor. Memory 220 may include one or more storage devices configured to store information used by CPU 210 to perform certain functions, operations, and steps related to embodiments of the present disclosure. Memory 220 may include a magnetic, semiconductor, tape, optical, or other type of storage device. In one embodiment, memory 220 may include one or more software application programs 225 that, when executed by CPU 210, perform various processes consistent with the present disclosure.

Methods, systems, and articles of manufacture consistent with the present disclosure are not limited to programs configured to perform dedicated tasks. For example, memory 220 may be configured with a program 225 that performs several functions consistent with the disclosure when executed by CPU 210. Alternatively, CPU 210 may execute one or more programs located remotely from requestor 102a. For example, requestor 102a may access one or more remote programs that, when executed, perform functions related to embodiments of the present disclosure. The configuration and number of individual programs implementing processes consistent with the disclosure are not critical to the disclosure, and one of ordinary skill in the art will understand that the disclosed processes may be implemented in a single program, or a plurality of such programs.

Memory 220 may also be configured with an operating system (not shown) that performs several functions well known in the art when executed by CPU 210. By way of example, the operating system may be Microsoft Windows™, Unix™, Linux™, an Apple™ operating system such as MAC OSX™, Personal Digital Assistant operating system such as Microsoft CE™, or any other operating system. The choice of operating system, and even the use of an operating system, is not critical to the disclosure.

I/O device(s) 230 may comprise one or more input/output devices that allow data to be received and/or transmitted by requestor 102a. For example, I/O device(s) 230 may include a network connection, keyboard, touch screen, mouse, microphone, disk reader, and/or other device(s) that enable data to be input or received from a user. Further, I/O device(s) 230 may include one or more output devices, such as a network connection, display screen, printer, speaker devices, and/or other device(s) that enable data to be output or presented to a user. The configuration and number of input and/or output devices incorporated in I/O device(s) 230 are not critical to the disclosure.

API 240 is an interface used by requestor 102a to execute user requests. In an embodiment, API 240 may be used in conjunction with I/O device 230 to define, for example, data change requests.

Database 250 may comprise one or more databases that store information and are accessed and managed through system 100. By way of example, database 250 may be an Oracle™ database, a Sybase™ database, or any other relational database.

FIGS. 3A-3C illustrate information that requestor(s) 102 may create or access from database 250. The information may be, for example, a Microsoft Word document, an Extensible Markup Language ("XML") document, an Excel spreadsheet, etc. As shown in FIGS. 3A-3C, the information may be presented in an Excel spreadsheet. The information may include one or more Table fields, which may identify a target database table, and one or more Operation fields, which may identify operations that may be performed, such as, for example, update, insert, and delete. One of ordinary skill would appreciate that numerous other operations may also be performed and identified in the Operation row.

The information may also include one or more Key fields, which may be used to identify the appropriate column for target record criteria purposes. The information may also include one or more Columns fields, which may identify the data that requestor 102a may create and/or change. As illustrated, the Column field may identify, for example, the firstname, lastname, phone, email, date of birth ("dob"), an update date ("dtupdate"), and/or an operator id ("operatorid"). One of ordinary skill would appreciate that numerous other Column names may also be listed, consistent with the data contained in the named column. The information may further include one or more data fields, which may identify the data values associated with the Column fields.

As illustrated in FIG. 3A, the target database table is titled "Company," the operation is "update," the columns to be updated include "firstname," "lastname," "phone," and "email," and the data contains information associated with the records of John Smith. Accordingly, because the operation is "update," requestor 102a may update one or more of the data fields associated with John Smith. For example, requestor 102a may update the phone number and/or email address. One of ordinary skill in the art would appreciate the other columns and data values may also be associated other persons, and each of those columns and/or data values may be updated by requestor 102a.

As illustrated in FIG. 3B, the target database table is titled "Company," the operation is "insert," the columns may include "firstname," "lastname," "email," "dob," "phone," "dtupdate," and "operatorid." Because the operation in FIG. 3B is "insert," the Key columns may apply, but they may not be specified. In addition, the data may include information associated with more than one person (e.g., John Smith, Jane Adams, Mike Jones, and Beth White, as illustrated). One of ordinary skill in the art would appreciate the other columns and data values may also be associated with each person, and each of those columns and/or data values may be inserted by requestor 102a.

As illustrated in FIG. 3C, the target database table is titled "Company," the operation is "delete," the columns may include "firstname" and "lastname." Specified keys may be associated with each column. In addition, the data may include information associated with more than one person, such as John Smith and Jane Adams. One of ordinary skill in the art would appreciate that other columns and data values may also be associated with each person, and each of those columns and/or data values may be inserted by requestor 102a. Likewise, the columns and/or data values for each person may also be deleted by requestor 102a.

FIG. 4A illustrates information that requestor(s) 102 may create or access from database 250. The information may be, for example, a Microsoft Word document, an Extensible Markup Language ("XML") document, an Excel spreadsheet, etc. According to the example illustrated in the FIGS. 4A-4D, the information may be presented in an Excel spreadsheet that may include different tabs for different spreadsheets (e.g. TABLE-A, TABLE-B, and TABLE-C), which correspond to different database entities. The different spreadsheets may be distinct and may not be related to each other. The information may include one or more Table fields, which may identify a target database table, and one or more Operation fields, which may identify operations that may be performed, such as, for example, update, insert, and delete. One of ordinary skill would appreciate that numerous other operations may also be performed and identified in the Operation row. The information may also include one or more Key fields, which may be used to identify the appropriate column for target record criteria purposes.

As illustrated in FIG. 4B, the target database table is titled "TABLE-A," the operation is "update," the columns may include "PK1," "PK2," "ATTRIB1," and "ATTRIB2," and the data may include information associated with columns "PK1," "PK2," "ATTRIB1," and "ATTRIB2." Accordingly, because the operation is "update," requestor 102a may update one or more of the data fields associated with each of the primary key columns (e.g. PK1 and PK2).

As illustrated in FIG. 4C, the target database table is titled "TABLE-B," the operation is "delete," the columns may include "PK1," and "PK2," and the data may include information associated with columns "PK1" and "PK2." Accordingly, because the operation is "delete," requestor 102a may delete one or more of the data rows associated with each of the primary keys (e.g. PK1 and PK2).

As illustrated in FIG. 4D, the target database table is titled "TABLE-C," the operation is "insert," the columns may include "ATTRIB1," "ATTRIB2," "ATTRIB3," "ATTRIB4," "ATTRIB5," "ATTRIB6," and "ATTRIB7" and the data may include information associated with columns "ATTRIB1," "ATTRIB2," "ATTRIB3," "ATTRIB4," "ATTRIB5," "ATTRIB6," and "ATTRIB7." Because the operation in FIG. 4D is "insert," the key columns do not apply, as explained above.

FIG. 5A illustrates information that requestor(s) 102 may create, update and/or delete from database 250. The information may be, for example, a Microsoft Word document, an Extensible Markup Language ("XML") document, an Excel spreadsheet, etc. According to the example illustrated in the FIGS. 5A-5C, the information may be presented in an Excel spreadsheet that may include different tabs for different spreadsheets (e.g. CHILD and PARENT). In addition, the different spreadsheets may be related to each other.

The information may include one or more Table fields, which may identify a target database table, and one or more Operation fields, which may identify operations that may be performed, such as, for example, update, insert, and delete. One of ordinary skill would appreciate that numerous other operations may also be performed and identified in the Operation row. The information may also include one or more Key fields, which may be used to identify the appropriate column for target record criteria purposes.

As illustrated in FIG. 5B, the target database table is titled "CHILD," the operation is "delete," the columns may include "PK2" and "PK3/FK1," and the data may include information associated with columns "PK2" and "PK3/FK1" (FK refers to a foreign key).

As illustrated in FIG. 5C, the target database table is titled "PARENT," the operation is "delete," the column may include "PK1/FK1," and the data may include information associated with column "PK1/FK1."

As stated above, spreadsheets "CHILD" and "PARENT" are related. Therefore, the "CHILD" spreadsheet may include a foreign key that may refer or point to a column key in the "PARENT" spreadsheet. As illustrated in FIGS. 5B and 5C, column key "PK3," contained within the "CHILD" spreadsheet, may be a foreign key that may be linked to the "PARENT" spreadsheet via column key "PK1." Therefore, if requestor 102a wants to delete information from the "PARENT" spreadsheet that is also contained in the "CHILD" spreadsheet, requestor 102a may be required to delete the information from the "CHILD" spreadsheet before deleting the information from the "PARENT" spreadsheet. This may be referred to as a "cascading" delete operation.

Alternatively, requestor 102a may delete information from the "PARENT" spreadsheet that is also contained in the "CHILD" spreadsheet directly from the "PARENT" spreadsheet. According to this example, when requestor 102a deletes the information from the "PARENT" spreadsheet, the information may be deleted from both the "PARENT" spreadsheet and the "CHILD" spreadsheet.

Figure 6:
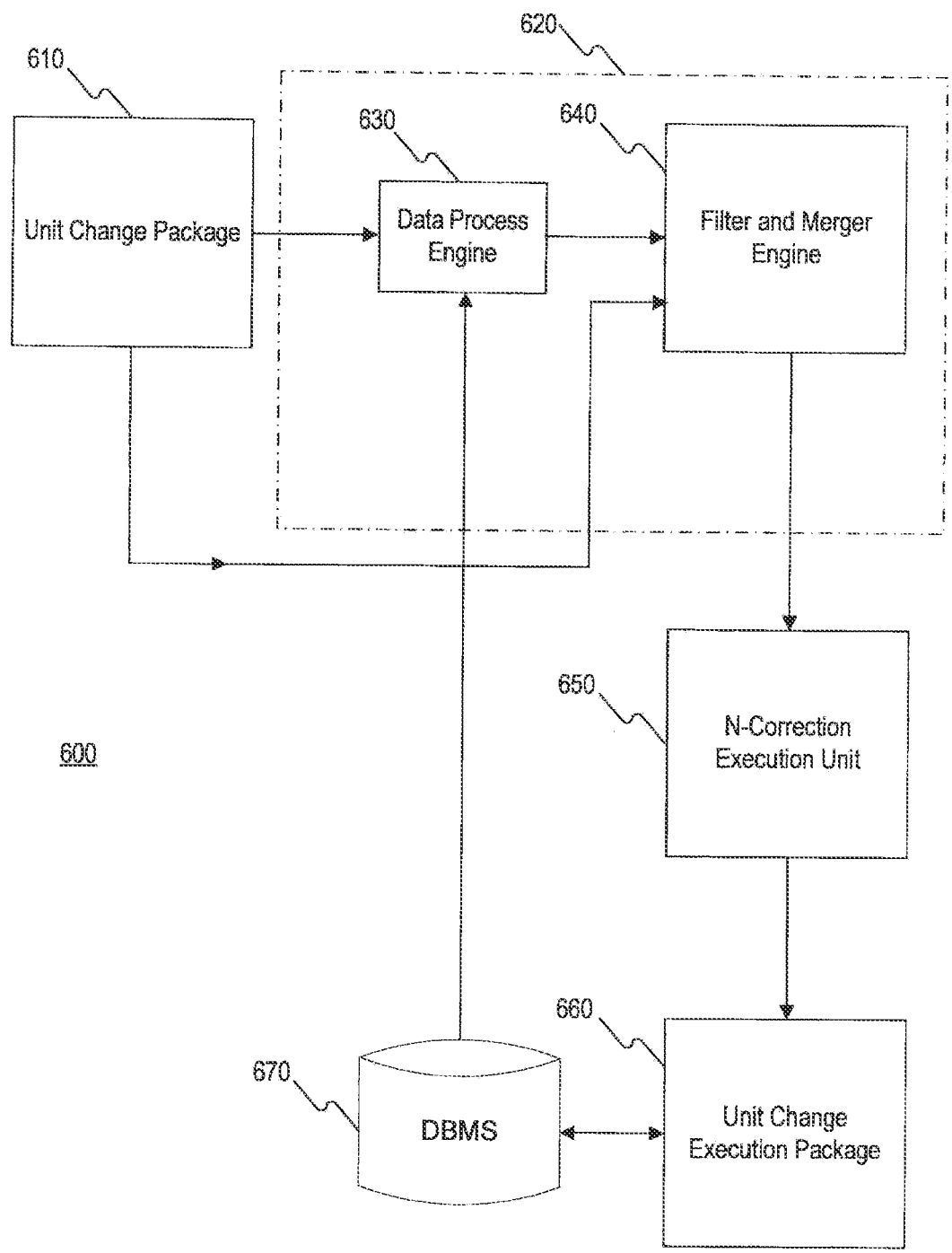
FIG. 6 illustrates a data correction system consistent with an embodiment of the present disclosure.

FIG. 6 illustrates an exemplary data correction system 600 consistent with the present disclosure. As illustrated in the FIG. 6, data correction system 600 may include unit package change 610, data correction engine 620, a data process engine 630, a filter and merger engine 640, an n-correction execution unit 650, a unit change execution package 660, and a Database Management System (DBMS) 670.

As illustrated in FIGS. 3A-3C, 4A-4D, and 5A-5C, requestor(s) 102 may perform various operations on data, including, for example, updating, deleting, and inserting data. For example, the data may include one or more personal records of homeowners. The records may include a person's name, address, and mortgage information such as, for example, a mortgage loan amount, mortgage loan interest rate, a remaining amount of payments on the mortgage loan, and a total amount of the mortgage loan outstanding. One of ordinary skill would appreciate that numerous other records may also be included for each person.

Personal records may need to be updated over time due to changes in the data contained in the record. For example, if the person moves to a different address, refinances a mortgage loan resulting in a different interest rate, and/or prepays the remaining mortgage loan amount, these changes may need to be reflected in the personal record to comply with financial reporting and disclosure of the Act. Therefore, requestor 102a may perform various operations on one or more personal records to indicate the requested change(s).

Accordingly, requestor(s) 102 may access the appropriate records stored in the appropriate business unit of the company and perform one or more operations on the data. There may be several types of data that requestor(s) 102 may update, insert or delete including, for example, an integer, a string, and a float. Examples of an integer may be a street number and phone number. Examples of a string may be a person's name or street name. Examples of a float may be a mortgage loan amount, interest rate, and remaining mortgage loan amount. One of ordinary skill in the art would appreciate that numerous other types of data may also be contained in the database. For example, the data may be binary data, such as a picture (e.g. JPEG or Bitmap), a video file (e.g. MP3 or MP4), a date field, a date and timefield, or any other type of data supported by DBMS 670.

Depending on the type of data that requestor(s) 102 wants to update, insert or delete, different statements may be created. These statements may be American National Standards Institute ("ANSI") statements that meet the requirements of one or more databases, such as, for example, Structured Query Language ("SQL") servers that contain the data. Different ANSI statements based on the type of data that requestor 102a is changing may be created for execution on a SQL server.

For example, if requestor 102a wants to delete entry "John Smith" (See FIG. 3C), requestor 102a may view the information for "John Smith" in a spreadsheet, XML document, or Word document presented to requestor 102a as a unit change package 610. When requestor 102a attempts to delete the entry for "John Smith," this data change may be input in a spreadsheet, and data correction engine 104 may generate an ANSI standard SQL statement for execution. As stated above, because requestor 102a is attempting to delete a person's name (e.g. "John Smith"), data correction engine 104 may generate an ANSI standard SQL statement based for a string. Alternatively, data correction engine 104 may generate an ANSI standard SQL statement based for an integer or a float if requestor 102a is changing a phone number or remaining mortgage loan amount, respectively.

As illustrated in FIGS. 4A-4D, requestor 102a may perform various operations on multiple documents that are unrelated. In addition, as illustrated in FIGS. 5A-5C, requestor 102a may perform various operations on multiple documents that are related. After requestor 102a performs each requested operation, the corresponding data change(s) may be transmitted to data correction engine 620. Data correction engine 620 may receive the data change(s) from unit change package 610 and, if more than one data change is requested, may process the data changes in sequential order independent of each change. For example, if requestor 102a is performing a single data change, data correction engine 620 may process that change. If requestor 102a is performing more than one data change, data correction engine 620 may process the changes in the order that requestor 102a entered them. In addition, as illustrated in FIGS. 5A-5C, if requestor 102a is changing data within a parent document that includes data in a related child document, data correction engine 620 may process the data change in the child document before processing the data change in the parent document.

In order to process the data change(s), data correction engine 620 may dissect the input form, data quality, and pattern generation based on the inputs. Data process engine 630 may process each data change as it appears in each of the one or more documents that may contain the data to be changed. First, data process engine 630 may verify the table name against a catalog of table names stored in DBMS 670. Next, data process engine 630 may verify the operation that is being performed (e.g. insert, update, or delete). Then, data process engine 630 may verify the columns and keys associated with the data change(s). Finally, data process engine 630 may verify the data change(s). As illustrated in FIG. 6, data process engine 630 may also receive information from DBMS 670.

After data process engine 630 performs the above operations, data process engine 630 may transmit the information to filter and merger engine 640. Filter and merger engine 640 may receive the data from data process engine 630 and may recombine the one or more filtering patterns and associated data into a table specific data correction SQL unit. As illustrated in FIG. 6, filter and merger engine 640 may also receive data directly from unit change package 610.

This information may be transmitted from filter and merger engine 640 to n-correction execution unit 650. N-correction execution unit 650 may combine each of the individual data changes, in the order they were received, into an integrated data correction SQL unit change execution package. After integration, n-correction execution unit 650 may transmit the data to unit change execution package 660. Unit change execution package 660 may receive the SQL(s) and execute the requested data change(s) as an atomic transaction comprising all of the changes. This ensures that if any one change request fails, then the whole change request fails. Upon execution of the data change(s), unit change execution package 660 may transmit the information to DBMS 670, and DBMS 670 may receive and roll-back/store the data change(s).

Figure 7:
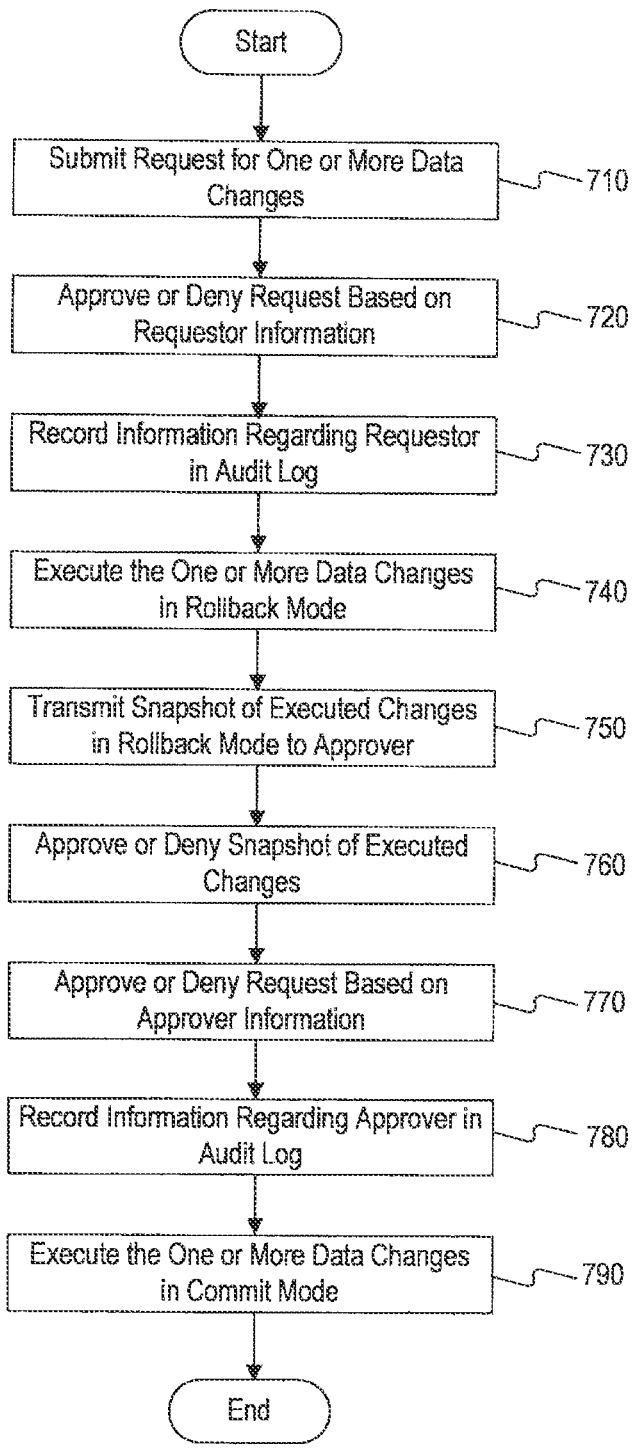
FIG. 7 illustrates a flowchart of an exemplary method for consistent with an embodiment of the present disclosure.

FIG. 7 is a flowchart for an exemplary method for processing data change requests, consistent with the present disclosure. Although the method illustrated in FIG. 7 is illustrated as a series of steps, it will be understood by those skilled in the art that non-dependent steps may be performed in a different order than illustrated, or in parallel.

Requestor 102a may identify one or more data changes, create the data change(s) (e.g. by requesting an update, insert, or delete operation) in a document such as, for example, a spreadsheet, XML document, or Word document, and submit the data change(s) for execution in step 710. Alternatively, requestor 102a may provide the SQL statement(s) for the desired one or more data changes instead of providing an identification of the data changes.

For example, based on the preferences of requestor 102a, requestor 102a may choose to create the SQL statement(s) rather than creating a data change request(s) for subsequent SQL statement(s) generation by data correction engine 620, as disclosed below. However, the SQL statement(s) are still reviewed, approved, and executed by DBMS 670 in a similar manner independent of how the SQL statement(s) are generated (e.g. by requestor 102a or data correction engine 620).

In step 720, audit database 106 may receive information associated with requestor 102a and check the information to determine if requestor 102a is an authenticated user and to verify that requestor 102a and approver 110a are not the same person. If requestor 102a is an authenticated user and requestor 102a and approver 110a are not the same person, requestor 102a is approved. Alternatively, if requestor 102a is not an authenticated user and/or requestor 102a and approver 110a are the same person, requestor 102a is not approved. These checks may ensure that the system complies with government and/or internal regulations.

If requestor 102a is authenticated, the method may proceed to step 730, in which audit database 106 may record the identity of requestor 102a, a time stamp indicating when the data change request(s) was made, and/or the reason for the data change request(s).

In step 740, the data change(s) may be processed by data correction system 600. Data correction engine 620 may generate one or more SQL statements that include the requested change(s). The SQL statement(s) may be generated after parsing the input data pattern and entity/table metadata information cataloged in DBMS 670 for the associated table/entity. The SQL statement(s) are executed in DBMS 670 in a rollback (noncommittal) mode as an atomic transaction. Also, at this time, any errors in the SQL statement(s) or data change request(s) may be identified based on rules corresponding to DBMS 670. As stated above, requestor 102a may provide the SQL statement(s). Therefore, if requestor 102a provides the SQL statement(s), data correction engine 620 may receive the SQL statement(s), and any errors in these SQL statement(s) provided by requestor 102a may also be identified based on the rules corresponding to DBMS 670.

The SQL statement(s) may be executed in DBMS 670 in a rollback mode. The SQL statement(s) may be executed as one transaction, and a snapshot of the results may be captured. This snapshot may include the values of the data before and after execution of the SQL statement(s). At this time, any errors in the SQL statement(s) may be identified based on rules corresponding to DBMS 670.

An example of a rule corresponding to DBMS 670 may be a NULL rule, which may correspond to a rule regarding a column that allows or disallows inserts or updates of rows containing a null (e.g. the absence of a value) in that column. Another example may be a unique values in column rule, which may correspond to a rule regarding a column (or set of columns) that may allow the insert or update of a row only if it contains a unique value in that column (or set of columns). Another example may be a referential integrity rule, which may correspond to a rule regarding when to allow a delete or update of cascading data that may have a parent-child relationship. According to the referential integrity rule, data in a parent table may not be deleted before deleting the corresponding data in a dependent child table(s), and attribute values that are foreign keys in the child table(s) may not be updated before the parent table(s) are updated to reflect the data change(s).

If no errors in the SQL statement(s) exist, the requested change(s) to the data may be executed by data correction engine 620 as a faux, or false, execution. Accordingly, the requested change(s) may not be persisted to DBMS 670. Instead, they may be captured in an audit log and may be stored in audit database 106 as a snapshot.

If one or more errors in the SQL statement(s) exist, the request may terminate, and one or more error messages may also be stored in audit database 106 as part of the snapshot. Accordingly, the snapshot may contain information regarding the data before application of the data change(s), a state of the data if the data change request(s) was applied and persisted to DBMS 670, and any errors that may exist.

In step 750, a indication may be transmitted to approver 110a that includes the stored snapshot of the requested data change(s). The indication may be an electronic message, such as a e-mail, or any other type of indication.

In step 760, approver 110a may review the stored snapshot of the data change(s). Approver 110a may also review any errors that may have occurred during execution of the requested data change(s). If no errors occurred, approver 110a may approve or deny some or all of the requested data change(s) for actual execution. The requests may be approved individually or as a group.

In step 770, audit database 106 may receive information associated with approver 110a and check the information to determine if approver 110a is an authenticated user and to determine that requestor 102a and approver 110a are not the same person. If approver 110a is an authenticated user and requestor 102a and approver 110a are not the same person, approver 110a may be approved. Alternatively, if approver 110a is not an authenticated user and/or requestor 102a and approver 110a are the same person, approver 110a is not approved. These checks may ensure that the system complies with government and/or internal regulations.

If approver 110a is authenticated, the method may proceed to step 780, in which audit database 106 may record the identity of approver 110a, a time stamp indicating when the approval was made, and the reason for the approval (if any). If approver 110a denies the requested data change(s), the identity of approver 110a may also be recorded in audit database, along with the reason for rejection and a time stamp indicating when the rejection was made.

In step 790, on approval of the request from the approver 110a, the one or more previously generated, successfully executed (in rollback mode) and saved SQL statements, that were executed in step 740, may be processed by data correction system 600. However, at this time, the SQL statement(s) is executed DBMS 670 in a data commit mode as an atomic transaction, and the change results are applied to DBMS 670.

If no errors in the SQL statement(s) exist, the requested change(s) to the data may be executed by data correction engine 620 as a persistent execution of the data change request(s). Accordingly, the requested data changes may be persisted to DBMS 670. The data change(s) may be captured in an audit log and may be stored in audit database 106 as a snapshot. This snapshot may contain a successful, completed execution of the requested data change(s) as well as the data values before the data change(s) were applied. This snapshot and the successful execution of the data change(s) may be transmitted to requestor 102a, approver 110a, and all other appropriate parties.

The foregoing description of possible implementations and embodiments consistent with the present invention does not represent a comprehensive catalog of all such implementations or all variations of the implementations described. The description of only some implementations should not be construed as an intent to exclude other implementations. Other embodiments of the invention will be apparent to those skilled in the art from consideration of the specification and practice of the invention disclosed herein. One of ordinary skill in the art will understand how to implement the invention in the appended claims in other ways using equivalents and alternatives that do not depart from the scope of the following claims. It is intended that the specification and examples be considered as exemplary only, with a true scope and spirit of the invention being indicated by the following claims.

What is claimed is:

1. A computer-implemented method for processing data change requests in a software production environment using an integrated platform that includes at least one processor, a database, and a memory, the method comprising:
    receiving, via the integrated platform, a plurality of data change requests for data stored in the database;
    combining the plurality of data change requests into a change execution package;
    identifying one or more related data files associated with the plurality of data change requests, wherein the one or more related data files comprise one or more parent data files and one or more child data files;
    applying the plurality of data change requests on the one or more related data files by executing the plurality of data change requests as false execution; and
    capturing results of the plurality of data change requests in an audit log as a snapshot.

2. The computer-implemented method of claim 1, wherein the change execution package combines the plurality of data change requests in the order that individual data change request of plurality of data change requests are received from the integrated platform.

3. The computer-implemented method of claim 1, further comprising executing the change execution package as an atomic transaction, wherein at least one failure of the plurality of data change requests cause the change execution package to fail.

4. The computer-implemented method of claim 1, wherein applying the plurality of data change requests comprises:
    generating a plurality of Structured Query Language (SQL) statements for the plurality of data change requests; and
    executing the plurality of SQL statements in a rollback model.

5. The computer-implemented method of claim 4, wherein executing the plurality of data change requests as false execution occurs when there is no error in the plurality of SQL statements.

6. The computer-implemented method of claim 1, wherein the plurality of data change requests are applied on the one or more child data files before being applied on corresponding parent data files.

7. The computer-implemented method of claim 1, further comprising applying the plurality of data change requests on the one or more related data files in a commit mode, wherein the results of the plurality of data change requests are committed to the data stored in the database.

8. A non-transitory computer-readable medium comprising instructions for performing, when executed by an integrated platform that includes a processor, a database, and a memory, operations for processing data change requests in a software production environment, the operations comprising:
  receiving, via the integrated platform, a plurality of data change requests for data stored in the database;
  combining the plurality of data change requests into a change execution package;
  identifying one or more related data files associated with the plurality of data change requests, wherein the one or more related data files comprise one or more parent data files and one or more child data files;
  applying the plurality of data change requests on the one or more related data files by executing the plurality of data change requests as false execution; and
  capturing results of the plurality of data change requests in an audit log as a snapshot.

9. The non-transitory computer-readable medium of claim 8, wherein the change execution package combines the plurality of data change requests in the order that individual data change request of plurality of data change requests are received from the integrated platform.

10. The non-transitory computer-readable medium of claim 8, wherein the operations further comprise executing the change execution package as an atomic transaction, wherein at least one failure of the plurality of data change requests cause the change execution package to fail.

11. The non-transitory computer-readable medium of claim 8, wherein applying the plurality of data change requests comprises:
  generating a plurality of SQL statements for the plurality of data change requests; and
  executing the plurality of SQL statements in a rollback mode.

12. The non-transitory computer-readable medium of claim 11, wherein executing the plurality of data change requests as false execution occurs when there is no error in the plurality of SQL statements.

13. Non-transitory computer-readable medium of claim 8, wherein the plurality of data change requests are applied on the one or more child data files before being applied on corresponding parent data files.

14. The non-transitory computer-readable medium of claim 8, wherein the operations further comprise applying the plurality of data change requests on the one or more related data files in a commit mode, wherein the results of the plurality of data change requests are committed to the data stored in the database.

15. A system for processing data change requests in a software production environment using an integrated platform, the system comprising:
  at least one processor, a database, a memory in communication with the at least one processor and configured to store instructions, wherein the at least one processor is configured to execute the stored instructions to:
    receive, via the integrated platform, a plurality of data change requests for data stored in the database;
    combine the plurality of data change requests into a change execution package;
    identify one or more related data files associated with the plurality of data change requests, wherein the one or more related data files comprise one or more parent data files and one or more child data files;
    apply the plurality of data change requests on the one or more related data files by executing the plurality of data change requests as false execution; and
    capture results of the plurality of data change requests in an audit log as a snapshot.

16. The system of claim 15, wherein the instructions further configure the at least one processor to execute the change execution package as an atomic transaction, wherein at least one failure of the plurality of data change requests cause the change execution package to fail.

17. The system of claim 15, wherein applying the plurality of data change requests comprises:
  generating a plurality of SQL statements for the plurality of data change requests; and
  executing the plurality of SQL statements in a rollback model.

18. The system of claim 17, wherein executing the plurality of data change requests as false execution occurs when there is no error in the plurality of SQL statements.

19. The system of claim 15, wherein the plurality of data change requests are applied on the one or more child data files before being applied on corresponding parent data files.

20. The system of claim 15, wherein the instructions further configure the at least one processor to apply the plurality of data change requests on the one or more related data files in a commit mode, wherein the results of the plurality of data change requests are committed to the data stored in the database.

* * * * *

UNITED STATES PATENT AND TRADEMARK OFFICE
CERTIFICATE OF CORRECTION

| | | |
|---|---|---|
| PATENT NO. | : 11,775,498 B1 | Page 1 of 1 |
| APPLICATION NO. | : 17/367693 | |
| DATED | : October 3, 2023 | |
| INVENTOR(S) | : Matthew Grzech et al. | |

It is certified that error appears in the above-identified patent and that said Letters Patent is hereby corrected as shown below:

In the Claims

Claim 4, Column 12, Line 67, "model" should read --mode--.

Claim 17, Column 14, Line 40, "model" should read --mode--.

Signed and Sealed this
Twenty-eighth Day of October, 2025

John A. Squires
*Director of the United States Patent and Trademark Office*